United States Patent
Azoulay et al.

(10) Patent No.: US 10,692,202 B2
(45) Date of Patent: Jun. 23, 2020

(54) FLAT SURFACE DETECTION IN PHOTOGRAPHS FOR TAMPER DETECTION

(71) Applicant: SERELAY LTD., London (GB)

(72) Inventors: Roy Azoulay, Oxford (GB); Benjamin Huston, London (GB); Clinton Montague, Reading Berkshire (GB)

(73) Assignee: SERELAY LIMITED, London (GB)

( * ) Notice: Subject to any disclaimer, the term of this patent is extended or adjusted under 35 U.S.C. 154(b) by 102 days.

(21) Appl. No.: 16/134,952

(22) Filed: Sep. 18, 2018

(65) Prior Publication Data

US 2020/0090318 A1 Mar. 19, 2020

(51) Int. Cl.
*G06T 7/00* (2017.01)
*G06N 3/08* (2006.01)
*H04N 5/235* (2006.01)
*G06T 3/00* (2006.01)
*G06K 9/62* (2006.01)
*G06K 9/46* (2006.01)
*G06T 3/60* (2006.01)

(52) U.S. Cl.
CPC .......... *G06T 7/0002* (2013.01); *G06K 9/4661* (2013.01); *G06K 9/6227* (2013.01); *G06K 9/6232* (2013.01); *G06K 9/6267* (2013.01); *G06N 3/08* (2013.01); *G06T 3/0068* (2013.01); *H04N 5/2353* (2013.01); *H04N 5/2354* (2013.01); *G06T 3/608* (2013.01); *G06T 2207/10144* (2013.01); *G06T 2207/10152* (2013.01); *G06T 2207/20081* (2013.01); *G06T 2207/20224* (2013.01)

(58) Field of Classification Search
CPC ....... G06T 7/002; G06T 3/0068; G06T 3/608; G06T 2207/10152; G06T 2207/10144; G06T 2207/20081; G06T 2207/20224; G06N 3/08; G06K 9/6227; G06K 9/6232; G06K 9/4661; G06K 9/6267; H04N 5/2353; H04N 5/2354
USPC ........................................................ 348/135
See application file for complete search history.

(56) References Cited

U.S. PATENT DOCUMENTS

| | | | | |
|---|---|---|---|---|
| 2008/0037878 A1* | 2/2008 | Katta | ................ | H04N 1/00474 382/224 |
| 2011/0299741 A1* | 12/2011 | Zhang | ................ | G06K 9/00228 382/117 |
| 2016/0292836 A1* | 10/2016 | Perry | .................. | G06F 3/04845 |
| 2017/0032530 A1* | 2/2017 | Furihata | ............. | G06K 9/00208 |

* cited by examiner

*Primary Examiner* — Allen C Wong
(74) *Attorney, Agent, or Firm* — Fresh IP PLC; Aubrey Y Chen

(57) ABSTRACT

Photographs can sometimes be altered or changed in order to create photographs which appear to be of a scene which never took place, or did not take place at the place and time when the photograph is purported to have been taken. One way of circumventing known systems to detect this sort of falsified image is to take a photograph of a printed altered image. The present invention is a method of detecting such "photographs of photographs" by comparing two photographs of the same seen taken at the same time, with different exposures.

20 Claims, 1 Drawing Sheet

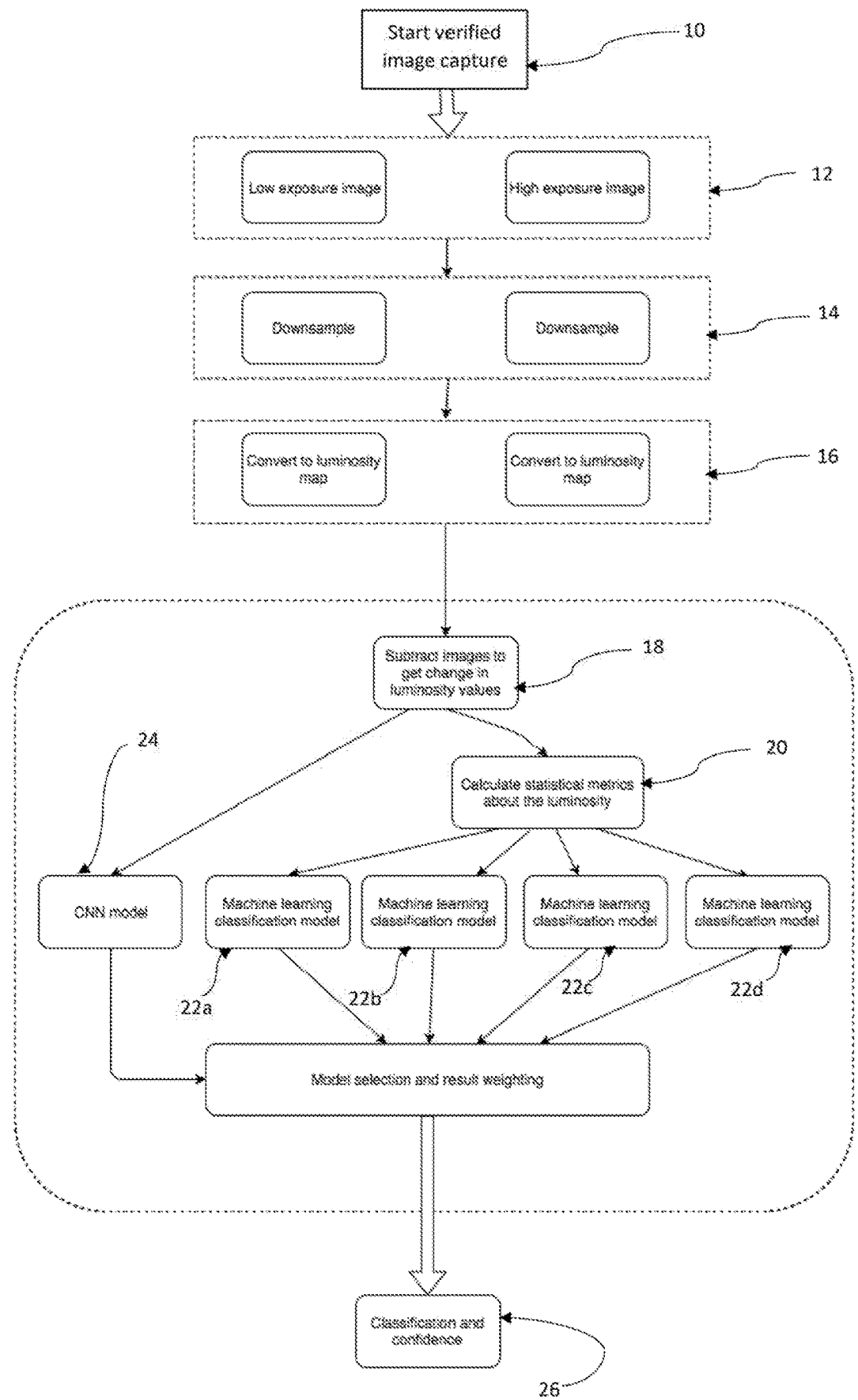

FLAT SURFACE DETECTION IN PHOTOGRAPHS FOR TAMPER DETECTION

The present invention relates to improvements in the detection of photographs which are not genuinely reflective of a real scene but have been tampered with.

BACKGROUND TO THE INVENTION

In various situations it is important to verify the authenticity of a photograph—in other words, to verify that a photograph is of a genuine scene which was in front of the lens of a camera at the time the photograph was taken. Examples of these situations include photographs submitted to support insurance claims, and photographs submitted by members of the public to news organisations. Photo editing and re-touching software is now readily available and even relatively cheap consumer-grade editing software can produce edited photographs where the changes are difficult to detect visually.

The applicant's co-pending application Ser. No. 15/863,419, which is incorporated herein by reference, describes a system whereby, by providing trusted software at the point of capture and using cryptographic transformations, the authenticity of a photograph can be to some extent guaranteed, in that with a high level of confidence the system can say that a particular photograph is of the unaltered scene which was in front of a camera at a particular place at a particular time.

However, one way of attempting to circumvent such a system would be to retouch or edit a photograph, to create an artificial or false scene, then to print out the altered photograph, and then to use the "trusted" system of Ser. No. 15/863,419 to take a photograph of the printed photograph at any particular time and place. Alternatively the altered photograph could be displayed on a screen and the screen could be photographed. In the right lighting conditions and with a suitable quality of print or display screen, the result may look visually very real. The assurances given by the trusted system would however not be valid, since the photograph may have been altered, staged in a different location at a different time, or completely falsified.

It is an object of the present invention to detect these "photographs of photographs".

SUMMARY OF THE INVENTION

According to the present invention, there is provided a method of capturing a photograph of a scene and verifying the photograph, the method comprising the steps of:
  using a digital camera to take at least two photographs of the same scene, the photographs being taken at different exposures;
  deriving a luminosity map from each photograph;
  subtracting a luminosity map derived from a first photograph from a luminosity so map derived from a second photograph to derive a map of change in luminosity;
  deriving statistical values about the distribution of change in luminosity;
  using the derived statistical values as inputs to at least one machine learning classification model, the machine learning classification model having been trained to identify where the photographs were of flat surfaces; and
  outputting an indication as to whether the photograph was of a flat surface.

The classification model may output a numerical confidence as to whether the photograph is of a flat surface. If the indication, above some threshold confidence, is that the photograph is not of a flat surface, i.e. it is of a real 3D scene, then the photograph may be treated as "verified" or "trusted" for the purposes of the test of this invention. The verification that the photograph is not of a flat surface may form part of a whole series of tests which can be carried out to detect various potential alterations or features which may make the photograph untrustworthy.

It is found that this method can accurately and reliably detect photographs of flat surfaces, whether the flat surface is a print or a display screen.

The photographs of the scene are taken at different exposures, in other words, the amount of light per unit area hitting the image sensor in the digital camera is different for each photograph. The exposure of a photograph is determined by the luminance of the scene and by the exposure value (EV) which in turn is a combination of the shutter speed and f-number. In embodiments of the invention, the different exposures of the photographs may be obtained either by changing the scene luminance—for example by taking one photograph with the flash turned on and one photograph without the flash—or by changing the exposure value (EV) of the camera between photographs.

Changing the scene luminance, for example using the flash, is found to more reliably give accurate results. However, this is considered to be a less desirable user experience. Ideally, from the user's point-of-view the system should behave more or less exactly the same as a camera taking an ordinary photograph, and where the flash is used in apparently inappropriate circumstances this may be unexpected and undesirable. Also, use of the flash consumes more energy from a device's battery. Altering the EV between exposures is a less obtrusive change, and is preferred if possible. However, with some types of scene it is found to give unreliable or uncertain results. Where there are dark surfaces in the scene, altering the EV will yield only small differences in the luminances. In some embodiments therefore, a selection may be made between altering the EV and altering the scene luminance (using the flash). This selection may be made for example by measuring properties of the scene, for example light levels. In some embodiments, a photograph may be taken and analysed to determine whether a changing EV or a changing luminance method will be used. In other embodiments, the whole process may be completed with a changing EV, and if the output from the classification model is uncertain beyond some threshold, then the process may be repeated using the (generally more reliable) method of altering the scene luminance using the flash.

It is envisaged that the two photographs are taken as close as possible to each other in time, and completely automatically. The method may be implemented for example by software running on a smartphone. From the user's point-of-view, capturing and verifying a photograph according to the method should not be a significantly different experience from capturing a photograph in the standard way using a smartphone.

A modern smartphone is ideal for implementing the method of the invention, because it typically has an integrated high-quality digital camera, and sufficient processing resources internally and/or access to sufficient external processing resources via a data network. However, other embodiments are possible using different hardware.

In some embodiments, more that two different photographs, having more than two different exposures, may be taken. Where the change in exposure is achieved by altering the EV between exposures, taking three photographs at three different exposures and producing three difference maps is found to give improved results over a range of different scene types. Note that two photographs will result in one difference map, three photographs will result in three difference maps, four photographs will result in six difference maps, etc.

The photographs taken in this way, which are optimised for detection of flat surfaces, might be sub-optimal as photographs. In other words, they may be over-exposed or under-exposed and therefore lack detail in light or dark areas. For this reason, in some embodiments an extra photograph may be taken which is not used as part of the flat surfaces detection system but which is optimally exposed. In most embodiments the optimal exposure may be set automatically.

The under-exposed and over-exposed "verification" photographs may be considered as metadata or secondary data relating to a "primary" photograph. In some embodiments, this is all stored by a server device in accordance with the method of Ser. No. 15/863,419.

A step of downsampling each photograph may be carried out prior to generating the luminosity maps. Downsampling reduces the noise level.

Converting to a luminosity map essentially means converting the image to greyscale.

Preferably, a step of alignment and deskewing may take place at some point before the map of change in luminosity is calculated. This compensates for any movement of the camera that may have taken place between exposures. The photographs are preferably taken automatically, one immediately after the other, and so any movement should be reasonably small.

The statistical values used as inputs to the machine learning classification model(s) may include, for example, the average change in luminosity per pixel, the standard deviation of change, and range of change.

The machine learning classification model(s) may include several different models, each of which individually receives inputs of the statistical values about the change in luminosity and outputs an indication (preferably a confidence score) as to whether the photograph is of a flat surface. The outputs from the models may then be weighted or selected to give a final indication/classification and confidence. The weighting/model selection may be driven by a further classifier, which in some embodiments may be a machine learning classification model, specifically a CNN (convolutional neural network). The purpose of the further classifier ("type-of-scene classifier") is to determine the "type of scene", since trained machine learning classifiers are found to be more reliable when the type of photograph they handle is narrowly defined. For example, a machine learning classifier trained exclusively on photographs of urban scenes with buildings will much more reliably be able to so identify flat "photographs of photographs" showing scenes of this type, than a general-purpose classifier trained on photographs of all types of scene. The purpose of the type-of-scene classifier is therefore to determine that the particular scene being handled is, for example, an urban scene with buildings, and then give more weight to the results from special purpose classifiers trained on photographs with this kind of scene.

The input to the type-of-scene classifier may be one or more of the original photographs, and/or one or more of the downsampled photographs, and/or one or more of the luminosity maps, and/or one or more of the luminosity difference maps.

As an alternative to a convolutional neural network or another type of learning classifier, the type-of-scene classifier could be a rule-based system.

The types of scene able to be identified by the type-of-scene classifier may include, for example, light images, dark images, indoor images, natural images, urban scenes, etc. Individual machine learning classification models may be trained specifically on images falling into a particular one of these categories.

In some embodiments, large flat areas may be identified and highlighted. This may allow for more intelligent human input to identify certain "difficult" results. For example, some photographs of genuine 3D scenes may contain large flat surfaces, for example, billboards or television screens. These large flat surfaces might cause the classifiers to output results indicating a "false" photograph—i.e. a photograph of a photograph, even though the scene is genuine. By highlighting the large flat area identified, a human reviewer can readily interpret the reasons for a such a determination. If a photograph has been highlighted as questionable but on review it is clear that the flat area identified follows the borders of a billboard which is the main subject of the photograph, then the output of the classifier can be understood and the photograph verified as showing at least that this image probably really did appear on the billboard, as it was photographed.

The method may be implemented, for example, by software running on a smartphone or similar portable device. Tablet computers and other portable devices having cameras may also be suitable. At least, in most embodiments the process of taking the two or more photographs at different exposures will be fully automated and controlled by the device. The two or more photographs will be taken as close as possible to each other in time, so that the user experience is substantially the same as taking a single photograph. The rest of the method may take place on the device or, alternatively, the photographs may be sent to a server for some or all of the follow-on steps. Preferably, the method is integrated into the method disclosed in Ser. No. 15/863,419 which in any case requires an external server. Communication means for transmitting data to the server will therefore be required in the device.

DESCRIPTION OF THE DRAWING

For a better understanding of the invention, and to show more clearly how it may be carried into effect, a specific embodiment will now be described by way of example only, with reference to the accompanying drawing in which:

FIG. 1 shows a flowchart of the method of the invention.

DESCRIPTION OF PREFERRED EMBODIMENT

Referring to FIG. 1, a verified image capture process is initiated on a portable device, for example a mobile smartphone, at step 10. The purpose of the verified image capture process is to create a verified or trusted image, i.e. an image where there is a justified level of confidence that the image is evidence of a genuine scene at a particular place and time. The verified image capture process may include cryptographic techniques and trusted hardware to provide this confidence, as described in Ser. No. 15/863,419. The purpose of the method which is the subject of this invention and which will be described in detail is to further increase confidence by catching cases where the image in front of the camera is not a genuine 3D scene, but is a flat print. These cases are important to detect, because where a photograph is taken of a print, there can be no confidence at all that the photograph reflects a real scene at a particular place and time—in fact it is highly likely that it does not.

At step 12, two photographs are taken at two different exposures. The capturing is controlled by software running on a portable device, for example a smartphone, and the two photographs are taken substantially automatically—the user may not even be conscious that more than one photograph is being taken. The photographs are taken as close together (in time) as hardware constraints will allow, and so should be substantially of the same scene. The different exposures may be obtained by taking the photographs with different camera settings (e.g. different aperture or different shutter speed)—i.e. changing the exposure value (EV) of the camera, or by changing the luminance of the scene itself, by using the flash for one photograph and not for the other.

At this stage, the photographs may be transmitted to a trusted server for further processing. Alternatively some or all of the further steps described below may be carried out on the device which takes the photographs. The choice will depend on the processing and memory resources available on the portable device, and also the assumptions which may be made as to the trustworthiness of the portable device. It is envisaged that in most embodiments, both of these considerations will point towards transmitting the photographs for further processing on a trusted server as early in the method as possible.

The further processing might take place at a substantially later time than the time the photographs were taken. This may be desirable for example if the device is low on battery or unable to transmit the photographs to the server for processing due to lack of network coverage, at the time the photographs are taken.

Each of the photographs is downsampled at step 14. Downsampling reduces the noise level in the photograph. In most embodiments the photographs will be taken on a mobile smartphone. These devices tend to have cameras which have high resolution but small sensors, leading to noisy images. Downsampling to a lower resolution can significantly reduce noise. The downsampled images are used for further processing to "verify" the photograph, but in many embodiments the original full resolution photographs, or at least one of them, may be retained in case the full resolution is needed, for example for large sized prints.

At step 16 a luminosity map is created from the photographs. Depending on the type of data created by the photographic sensor, a colour photograph may or may not include a separate luminosity channel. For a photograph from a smartphone camera a separate luminosity channel will not normally be available and will have to be generated, typically from red, green and blue colour channels. A luminosity map (essentially a greyscale image) can be created in various ways, typically by weighting the red green and blue channels in proportion to the sensitivity typical of human vision perception and taking an average. However, for the purposes of the verification method of the invention, different weightings may be used. In some embodiments, even different luminosity maps and subsequently different luminosity difference maps could be created depending on the circumstances (for example, depending on the type of scene).

At step 18, a luminosity difference map is created by subtracting the luminosity map derived from one photograph from the luminosity map derived from the other photograph. At step 20, statistical metrics are calculated about the luminosity. For example, the average change per pixel, the standard deviation of change, and the range of change. These statistical metrics are used as inputs to multiple different machine learning classification models 22. In FIG. 1, four different classification models 22*a, b, c, d* are shown, although in embodiments more or fewer classification models may be used. The different classification models are produced by training machine learning models using different subsets of training data. For example, model 22*a* might be trained on photographs containing photographs of buildings, model 22*b* might be trained on photographs of countryside scenes, model 22*c* might be trained on photographs of people, etc. Some models may be trained on a very narrow category of photographs and some models may be given training data in a broader category (for example, any photograph taken outside). All of these models 22 are trained to identify "photographs of photographs", i.e. where what is in front of the lens is not a real 3D scene but is a flat surface depicting a scene, for example a printed photograph or a photograph on a TV or computer display.

A "type of scene" classifier 24 is provided, and its purpose is to determine the selection and weighting of results from the machine learning classification models 22. The type-of-scene classifier 24 may be another machine learning model, for example a convolutional neural network (CNN). If the type-of-scene classifier determines, for example, that the photograph is a countryside scene, then a greater weighting will be given to the results of classifiers narrowly trained on this type of photograph, and inappropriate classifiers (trained narrowly on a completely different type of scene) might be excluded altogether—i.e. given a zero weighting. General-purpose classifiers may be given some weighting, but typically less than the special purpose classifiers, where a photograph is found to fall with high confidence into a special category.

Although in FIG. 1 the input of the type-of-scene classifier 24 is shown as a luminosity difference map created in step 18, the type-of-scene classifier 24 in different embodiments may be provided with inputs of one, some or all of the original images, and/or one, some or all of the downsampled images, and/or one, some or all of the luminosity maps, and/or one, some or all of the luminosity difference maps.

The output 26 of the method of the invention is typically a classification (either "flat surface" or not) and a confidence level for that classification. Put another way, the output could be a probability that the image is "real" in the sense that it is of a real 3D scene. This information may be used, for example, to mark the photograph as "verified" if it passes some threshold. It adds a particularly valuable extra layer of trust in the context of the system described in Ser. No. 15/863,419 where cryptographic transformations and trusted hardware are used to provide a verifiable "chain of custody" for a captured image.

Changes and modifications within the scope of the invention will be apparent to the skilled person. The invention is defined in the claims.

The invention claimed is:

1. A method of capturing a photograph of a scene and verifying the photograph, the method comprising the steps of:
   using a digital camera to take at least two photographs of the same scene, the photographs being taken at different exposures;
   deriving a luminosity map from each photograph;
   subtracting a luminosity map derived from a first photograph from a luminosity map derived from a second photograph to derive a map of change in luminosity;
   deriving statistical values about the distribution of change in luminosity;

using the derived statistical values as inputs to at least one machine learning classification model, the machine learning classification model having been trained to identify where the photographs were of flat surfaces; and outputting an indication as to whether the photograph was of a flat surface.

2. A method of capturing a photograph as claimed in claim 1, in which the two photographs are taken at different exposures by varying the scene luminance by activating a flash or lamp for one photograph, and not activating the flash or lamp for the other photograph.

3. A method of capturing a photograph as claimed in claim 1, in which the two photographs are taken at different exposures by varying the exposure value (EV) of the camera between photographs.

4. A method of capturing a photograph as claimed in claim 1, including a step of downsampling each photograph prior to generating the luminosity maps.

5. A method of capturing a photograph as claimed in claim 1, in which a step of alignment and deskewing takes place before the map of change in luminosity is calculated.

6. A method of capturing a photograph as claimed in claim 1, in which the derived statistical values include the average change in luminosity per pixel.

7. A method of capturing a photograph as claimed in claim 1, in which the derived statistical values include the standard deviation of change.

8. A method of capturing a photograph as claimed in claim 1, in which the derived statistical values include the range of change.

9. A method of capturing a photograph as claimed in claim 1, in which a plurality of different machine learning classification models all receive inputs of the derived statistical values, and the outputs from the plurality of models are selected or weighted to give a final indication of classification and confidence.

10. A method of capturing a photograph as claimed in claim 9, in which the model selection/weighting is determined by a type-of-scene classifier.

11. A method of capturing a photograph as claimed in claim 10, in which at least one of the photographs taken by the camera is used as an input to the type-of-scene classifier.

12. A method of capturing a photograph as claimed in claim 10, in which at least one of the luminosity maps derived from photographs is used as an input to the type-of-scene classifier.

13. A method of capturing a photograph as claimed in claim 10, in which at least one of the maps of change in luminosity is used as an input to the type-of-scene classifier.

14. A method of capturing a photograph as claimed in claim 9, in which the type-of-scene classified is a convolutional neural network (CNN).

15. A method of capturing a photograph as claimed in claim 1, in which the digital camera is part of a portable electronic device, the portable electronic device including transmission means, and the portable electronic device comprising a smartphone.

16. A method of capturing a photograph as claimed in claim 15, in which parts of the method are carried out on the portable electronic device, and parts of the method are carried out on a server, the transmission means being used to send data from the portable electronic device to the server.

17. One or more computer programs stored on a non-transitory computer readable medium, the computer program(s) when executed on a processor or on multiple communicating processors carrying out the method of claim 1.

18. A system for capturing a photograph, the system including a portable device having a digital camera, and at least one processor, and software adapted to carry out the steps of:

causing the digital camera to take at least two photographs of the same scene, the photographs being taken at different exposures;

deriving a luminosity map from each photograph;

subtracting a luminosity map derived from a first photograph from a luminosity map derived from a second photograph to derive a map of change in luminosity;

using the derived statistical values as inputs to at least one machine learning classification model, the machine learning classification model having been trained to identify where the photographs were of flat surfaces; and outputting an indication as to whether the photograph was of a flat surface.

19. A system for capturing a photograph as claimed in claim 18, further comprising a server, and a data transmission channel between the portable device and the server, in which software running on the server is adapted to carry out at least some of the steps of:

deriving a luminosity map from each photograph;

subtracting a luminosity map derived from a first photograph from a luminosity map derived from a second photograph to derive a map of change in luminosity; and using the derived statistical values as inputs to at least one machine learning classification model, the machine learning classification model having been trained to identify where the photographs were of flat surfaces.

20. A system for capturing a photograph as claimed in claim 18, in which the camera has a flash or lamp and the flash or lamp is turned on for one of the at least two photographs, and in which the flash or lamp is turned off for the other of the at least two photographs.

* * * * *